United States Patent
Aronowich et al.

(10) Patent No.: US 7,974,989 B2
(45) Date of Patent: Jul. 5, 2011

(54) COMPUTER IMPLEMENTED SYSTEM AND METHOD FOR ENHANCING KEYWORD EXPANSION

(75) Inventors: Michael Aronowich, Haifa (IL); Amir Bar, Rehovot (IL); Nir Cohen, Rishon LeZion (IL)

(73) Assignee: Kenshoo Ltd., Tel Aviv (IL)

( * ) Notice: Subject to any disclaimer, the term of this patent is extended or adjusted under 35 U.S.C. 154(b) by 300 days.

(21) Appl. No.: 12/031,352

(22) Filed: Feb. 14, 2008

(65) Prior Publication Data

US 2008/0201324 A1 Aug. 21, 2008

Related U.S. Application Data

(60) Provisional application No. 60/902,055, filed on Feb. 20, 2007.

(51) Int. Cl.
*G06F 17/00* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

2006/0248078 A1* 11/2006 Gross et al. ................ 707/5
2008/0065440 A1* 3/2008 Graham et al. ............ 705/7

OTHER PUBLICATIONS https://adwords.google.com/select/KeywordToolExternal, May 5, 2008.
K. Bartz et al., *Logistic Regression and Collaborative Filtering for Sponsored Search Term Recommendation*, Jun. 2006.
V. Abhishek, *Keyword Generation for Search Engine Advertising using Semantic Similarity between Terms*, May 2007, WWW2007.
Joshi, Motwani, *Keyword Generation for Search Engine Advertising*, Dec 2006, ICDM Workshops 2006.
http://tools/seobook.com/keyword-tools/seobook/, May 5, 2008.
http://inventory.overture.com/d/searchinventory/suggestion, May 5, 2008.
http://www.wordtracker.com/, May 5, 2008.

* cited by examiner

*Primary Examiner* — Isaac M Woo
(74) *Attorney, Agent, or Firm* — Myers Wolin, LLC

(57) ABSTRACT

A computerized system which implements a method for obtaining an improved set of relevant keywords from an initial set of relevant keywords and their associated relative ratings, utilizing the proven expertise and reliability of existing keyword expansion tools and the accumulated experience of search engines. The method comprises iterating over keyword seeds, search engines' results and keyword suggestion sources' results, merging lists of keywords and combining their scores by means of an optimization method and learned effectiveness of result sources. Keyword relevance scores may be effectively used to distribute a content provider's resources amongst keywords thereby to achieve inclusion and optimization in search engines' results. The system input is a set of one or more seed keywords and the system produces an expanded list of unique keywords, each keyword typically accompanied by a computed relevance score.

17 Claims, 10 Drawing Sheets

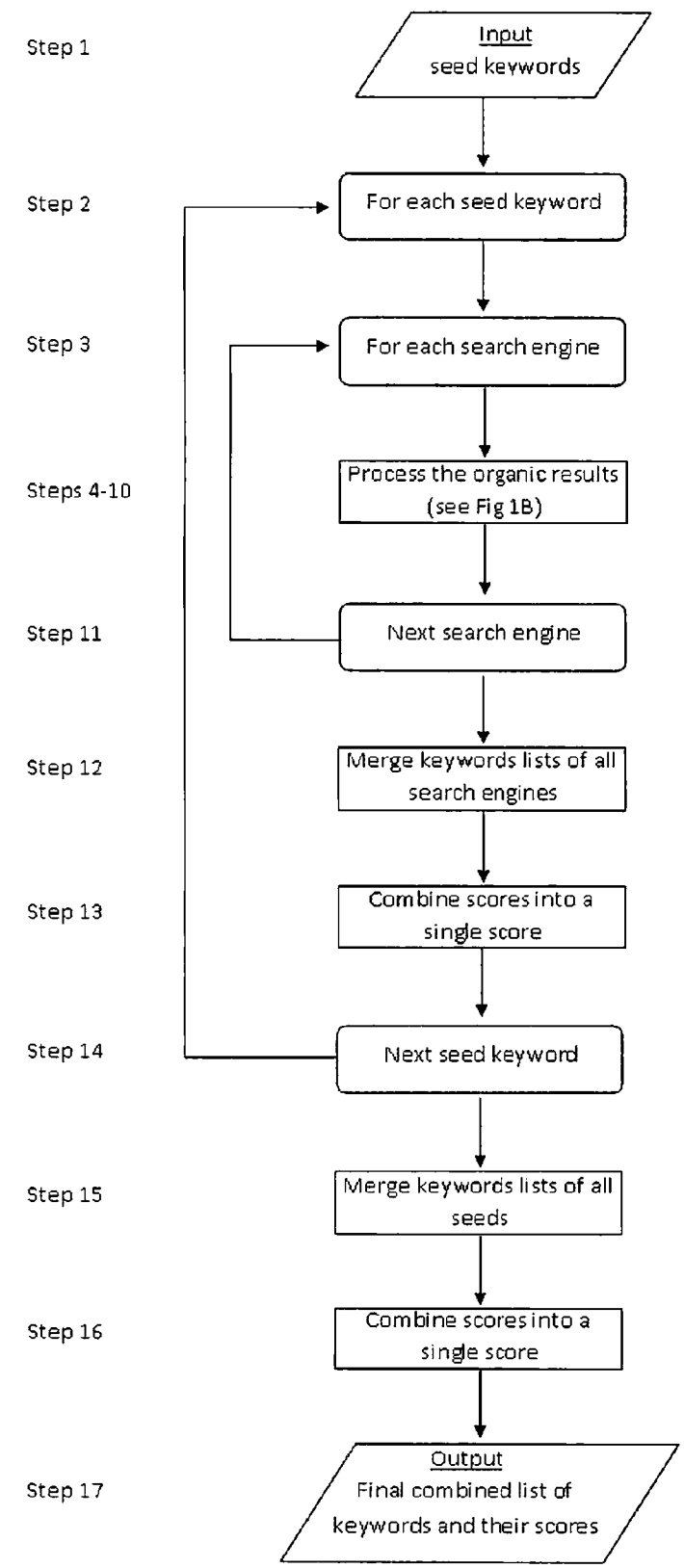
Fig 1A: Flow chart of the outer loop over seeds and search engines

Fig 1B: Flow chart of the inner loop over organic results and keyword suggestion sources
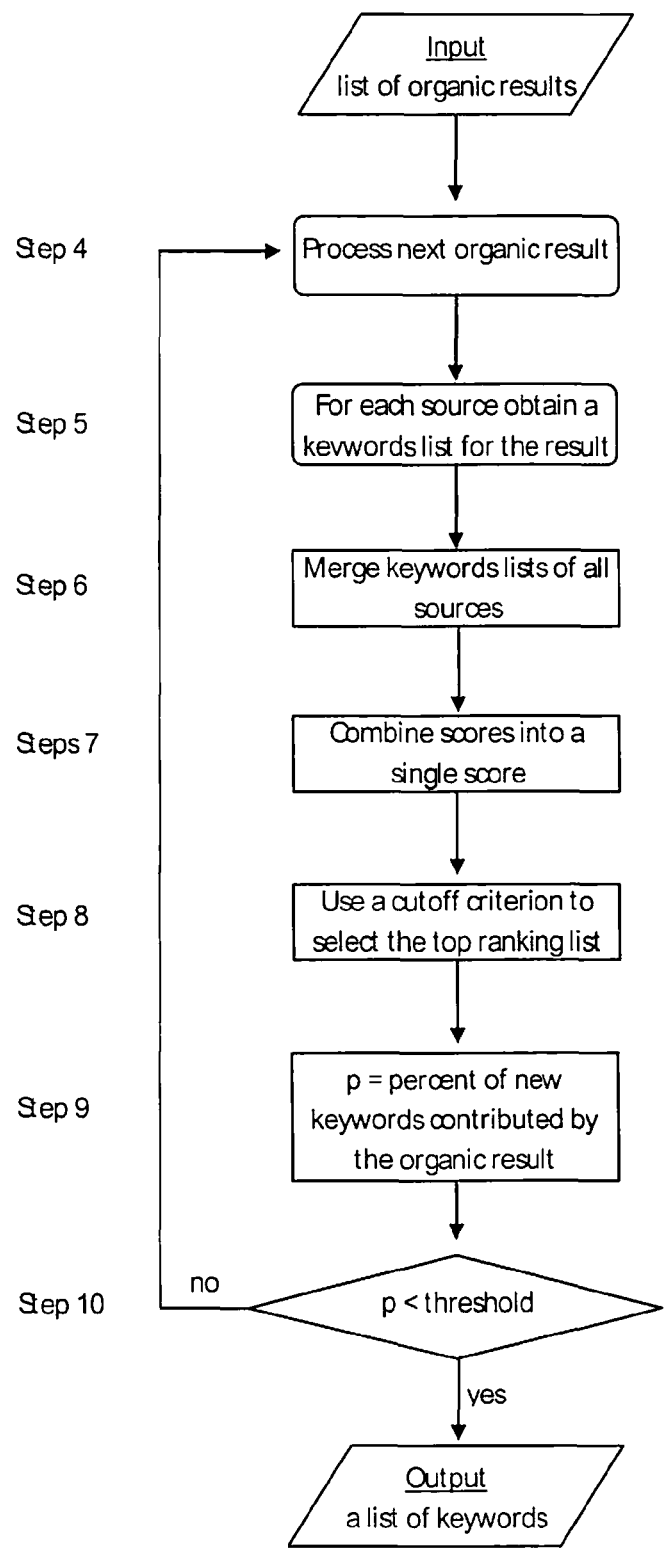

Seed1, SE1, Result 1, KST1, KST2, KST3

| keyword | Score1 | Score2 | Score3 |
|---|---|---|---|
| Order pizza online | 6 | 2 | 3 |
| Pizza coupons | 6 | 1 | 3 |
| Fast food coupons | 4 | 0 | 2 |
| Restaurants | 2 | 2 | 1 |
| Fast service | 3 | 0 | 1 |
| Good food | 0 | 1.5 | 0 |
| Going out | 0 | 0.5 | 1 |

Fig 2C

Seed1, SE1, Result 1, KST1, KST2, KST3

| keyword | Score1 | Score2 | Score3 | combined score |
|---|---|---|---|---|
| Order pizza online | 6 | 2 | 3 | 0.344*6 + 0.402*2 + 0.254*3 = 3.6 |
| Pizza coupons | 6 | 1 | 3 | 3.2 |
| Fast food coupons | 4 | 0 | 2 | 1.9 |
| Restaurants | 2 | 2 | 1 | 1.4 |
| Fast service | 3 | 0 | 1 | 1.3 |
| Good food | 0 | 1.5 | 0 | 0.6 |
| Going out | 0 | 0.5 | 1 | 0.5 | cutoff → (between Restaurants and Fast service)

Fig 2D

Seed1, SE1, Result 2, KST1, KST2, KST3

| keyword | Score1 | Score2 | Score3 | combined score |
|---|---|---|---|---|
| Order pizza online | 5 | 2 | 3 | 3.6 |
| Pizza coupons | 5 | 1 | 3 | 3.2 |
| Fast food coupons | 4 | 0 | 2 | 2.2 |
| Restaurants guide | 2 | 0.5 | 1 | 1.3 |
| Fast service | 1 | 1 | 1 | 0.8 |
| Good food | 0 | 1.5 | 0 | 0.6 | cutoff → (between Fast service and Good food)

Fig 2E

Seed1, SE2, Result1, KST1, KST2, KST3

| Keyword | Score1 | Score2 | Score3 | combined score |
|---|---|---|---|---|
| Pizza delivery N.Y. | 4 | 2 | 4 | 3.6 |
| Food on sale | 5 | 1 | 3 | 3.8 |
| Fast food coupons | 4 | 0 | 2 | 2.8 |
| Restaurants guide | 2 | 0.5 | 1 | 1.5 |
| Fast service | 3 | 0 | 0 | 1.8 |
| Good food | 0 | 1.5 | 0 | 0.3 |

Fig 2F

Seed1, SE2, Result 2, KST1, KST2, KST3

| keyword | Score1 | Score2 | Score3 | combined score |
|---|---|---|---|---|
| Pizza online | 6 | 3 | 4 | 4.3 |
| Value meal delivery | 5 | 1 | 3 | 3.7 |
| Fast food coupons | 4 | 0 | 2 | 2.7 |
| Restaurants guide | 2 | 0.5 | 1 | 2.5 |
| Fast service | 3 | 0 | 0 | 2.3 |
| Good food | 0 | 1.5 | 0 | 1.2 |

Fig 2G

Seed1, SE1, SE2

| keyword | SE1 result1 | SE1 result2 | SE2 result1 | SE2 result2 | combined score |
|---|---|---|---|---|---|
| Pizza online | 0 | 0 | 0 | 4.3 | 0.86 |
| Order pizza online | 4 | 3.7 | 0 | 0 | 2.11 |
| Pizza delivery N.Y. | 0 | 0 | 3.6 | 0 | 0.9 |
| Pizza coupons | 3.2 | 3.1 | 0 | 0 | 1.73 |
| Food on sale | 0 | 0 | 3.2 | 0 | 0.8 |
| Fast food coupons | 0 | 3 | 0 | 4 | 1.7 |
| Value meal delivery | 0 | 0 | 0 | 3 | 0.6 |
| Fast food coupons | 1.9 | 1.7 | 1.4 | 2.7 | 1.88 |
| Restaurants | 1.4 | 0 | | 0 | 0.35 |
| Restaurants guide | 2 | 1 | 1 | 1 | 1.25 |
| Fast service | 1.3 | 1.3 | 1 | 2.3 | 1.43 |
| Good food | 0.6 | 1.2 | 0.6 | 1.2 | 0.9 |
| Going out | 0.5 | 0 | 0 | 0 | 0.13 |
| Value meal delivery | 0 | 0 | 0 | 2 | 0.4 |

Fig 3A

Seed 2 SE1 SE1Result1

| Keyword | Score |
|---|---|
| Pizza Online | 7 |
| Best Pizza N.Y | 6 |
| Pizza Deliveries | 4.2 |
| Pizza free delivery | 3.8 |
| Fast food restaurants | 2.2 |
| Restaurants guide | 2.0 |
| Good food | 1.4 |

Fig 3B

Seed 2 SE1 SE1Result2

| Keyword | Score |
|---|---|
| Pizza Online | 6 |
| Best Pizza N.Y | 5.5 |
| Pizza Deliveries | 4.2 |
| Pizza free delivery | 3.1 |
| Pizza delivery | 3 |
| Restaurants guide | 1.4 |
| Good food | 1.2 |
| Fast food coupons | 1.7 |

Fig 3C

Seed 2 SE2 SE2Result1

| Keyword | Score |
|---|---|
| Pizza Online | 6 |
| Pizza Deliveries | 4.1 |
| Pizza delivery | 4.4 |
| Restaurants guide | 1 |
| Good food | 0.8 |
| Fast food coupons | 1.4 |
| Fast food | 3.2 |

Fig 3D

Seed 2 SE2 SE2Result2

| Keyword | Score |
|---|---|
| Pizza Online | 8 |
| Best Pizza N.Y | 4.7 |
| Pizza free delivery | 4 |
| Pizza order | 3 |
| Restaurants guide | 1.4 |
| Good food | 1.1 |
| Fast food coupons | 2.7 |
| Fast food | 3.2 |

Fig 3E

Seed2, SE1, SE2

| keyword | SE1 result1 | SE1 result2 | SE2 result1 | SE2 result2 | combined score |
|---|---|---|---|---|---|
| Pizza online | 7 | 6 | 6 | 8 | 6.7 |
| Best pizza N.Y | 6 | 5.5 | 0 | 4.7 | 3.3 |
| Pizza delivery | 0 | 4 | 4.4 | 0 | 2.5 |
| Pizza deliveries | 4.2 | 3.1 | 4.1 | 0 | 3.6 |
| Fast food | 0 | 0 | 3.2 | 0 | 1.3 |
| Pizza free delivery | 3.8 | 3 | 0 | 4 | 2.4 |
| Pizza order | 0 | 0 | 0 | 3 | 0.3 |
| Fast food coupons | 0 | 1.7 | 1.4 | 2.7 | 0.8 |
| fast food restaurants | 2.2 | 0 | 0 | 0 | 0.4 |
| Restaurants guide | 2.0 | 1.4 | 1 | 1.4 | 1.4 |
| Good food | 1.4 | 1.2 | 0.8 | 1.1 | 0.9 |

Fig 4A

Seed1, Seed2

| keyword | Seed1 combined score | Seed2 combined score | Combined score |
|---|---|---|---|
| Pizza online | 1.2 | 6.7 | 3.4 |
| Best pizza n.y. | 0 | 3.3 | 1.3 |
| Pizza delivery | 0 | 2.5 | 1 |
| Pizza deliveries | 0 | 3.6 | 1.4 |
| Fast food | 0 | 1.3 | 0.5 |
| Pizza order | 0 | 0.3 | 0.1 |
| Order pizza online | 2.1 | 3.7 | 2.7 |
| Pizza delivery n.y. | 0.8 | 0 | 0.5 |
| Pizza coupons | 2.3 | 3.1 | 2.6 |
| Food on sale | 0.6 | 0 | 0.4 |
| Fast food coupons | 2.4 | 3 | 2.6 |
| Value meal delivery | 0.3 | 0 | 0.2 |
| Fast food coupons | 1.8 | 0.8 | 1.4 |
| Fast food restaurants | 0 | 0.4 | 0.2 |
| Restaurants | 0.4 | 0 | 0.2 |
| Restaurants guide | 1.4 | 1.4 | 1.4 |
| Fast service | 1.7 | 0 | 1 |
| Good food | 0.9 | 0.9 | 0.9 |
| Going out | 0.2 | 0 | 0.1 |
| Value meal delivery | 0.4 | 0 | 0.2 |

Fig 4B

| Keyword | Score |
|---|---|
| Pizza online | 3.4 |
| Order pizza online | 2.7 |
| Pizza coupons | 2.6 |
| Pizza online | 2.6 |
| Pizza deliveries | 1.4 |
| Fast food coupons | 1.4 |
| Restaurants guide | 1.4 |
| Best pizza N.Y. | 1.3 |
| Pizza delivery | 1 |
| Fast service | 1 |
| Good food | 0.9 |
| Fast food | 0.5 |
| Pizza delivery N.Y. | 0.5 |
| Pizza online coupons | 0.4 |
| Value meal delivery | 0.2 |
| Fast food restaurants | 0.2 |
| Restaurants | 0.2 |
| Value meal delivery | 0.2 |
| Pizza order | 0.1 |
| Going out | 0.1 |

US 7,974,989 B2

COMPUTER IMPLEMENTED SYSTEM AND METHOD FOR ENHANCING KEYWORD EXPANSION

REFERENCE TO CO-PENDING APPLICATIONS

Priority is claimed from U.S. provisional application No. 60/902,055, entitled COMPUTER IMPLEMENTED SYSTEM AND METHOD FOR ENHANCING KEYWORD EXPANSION and filed Feb. 20, 2007.

FIELD OF THE INVENTION

The present invention relates generally to search engines and more particularly to computerized searches using keywords.

BACKGROUND OF THE INVENTION

Computerized searching is well known.

The disclosures of any publications and patent documents mentioned in the specification, and of any publications and patent documents cited therein directly or indirectly, are hereby incorporated by reference.

SUMMARY OF THE INVENTION

Certain embodiments of the present invention seek to provide improved methods and systems for computerized searches and/or for enhancing expansion of keywords for such searches.

Certain embodiments of the current invention have applications in the fields of Search Engine Marketing and search engine optimization. Web content publishers often struggle to find a comprehensive list of keywords that is most worthwhile to promote in order to get maximum exposure of their content to a targeted audience utilizing minimum resources. Certain embodiments of the proposed method improve the process of finding the long tail, the comprehensive list of relevant keywords which will deliver maximum exposure of best quality to a digital content one wants to promote.

Any suitable processor, display and input means may be used to process, display, store and accept information, including computer programs, in accordance with some or all of the teachings of the present invention, such as but not limited to a conventional personal computer processor, workstation or other programmable device or computer or electronic computing device, either general-purpose or specifically constricted, for processing; a display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices.

BRIEF DESCRIPTION OF THE DRAWINGS

Certain embodiments of the present invention are illustrated in the following drawings:

FIGS. 1A-1B, taken together, illustrate a flow chart of the method of certain embodiments;

FIGS. 2A-4B show examples of certain embodiments;

FIGS. 2A-2G show examples of an expansion for the first seed (seed1) with two organic results (SE1Result1, SE1Result2) of the first search engine (SE1) and two organic results (SE2Result1, SE2Result2) of the second search engine (SE2);

FIG. 2A illustrates a possible outcome of expanding seed1 using the SE1Result1;

FIG. 2B shows a merged table of the results shown in 2A;

FIG. 2C shows a table where the calculated combined score is added to 2B. Also illustrated is the cutoff position;

FIG. 2D shows a merged table of the results of expanding seed1 using the SE1Result2 of SE1. Also illustrated is the cutoff;

FIG. 2E shows a merged table of the results of expanding seed1 using SE2Result1;

FIG. 2F shows a merged table of the results of expanding seed1 using SE2Result2;

FIG. 2G shows a merged table of the results of SE1 and SE2 for seed1 (combining FIGS. 2A-2F);

FIGS. 3A-3E show examples of an expansion for the second seed (seed2) using the organic results of SE1 and SE2 in a similar manner as for FIGS. 2A-G:

FIG. 3A shows a merged table of the results of expanding seed2 using SE1Result1;

FIG. 3B shows a merged table of the results of expanding seed2 using SE1Result2;

FIG. 3C shows a merged table of the results of expanding seed2 using SE2Result1;

FIG. 3D: A merged table of the results of expanding seed2 using SE2Result2

FIG. 3E shows a merged table of the results of SE1 and SE2 for seed2 (combining FIGS. 3A-3E);

FIGS. 4A-4B show The final merging of the former results into a coherent keyword suggestion list;

FIG. 4A shows a combined list of the results of the expansion of seed1 (FIG. 2G) and seed2 (FIG. 3E); and FIG. 4B shows the final combined list, ordered by descending combined score, which is given as the keywords suggestion list to the user.

DETAILED DESCRIPTION OF CERTAIN EMBODIMENTS OF THE INVENTION

Figures 2A, 2B:
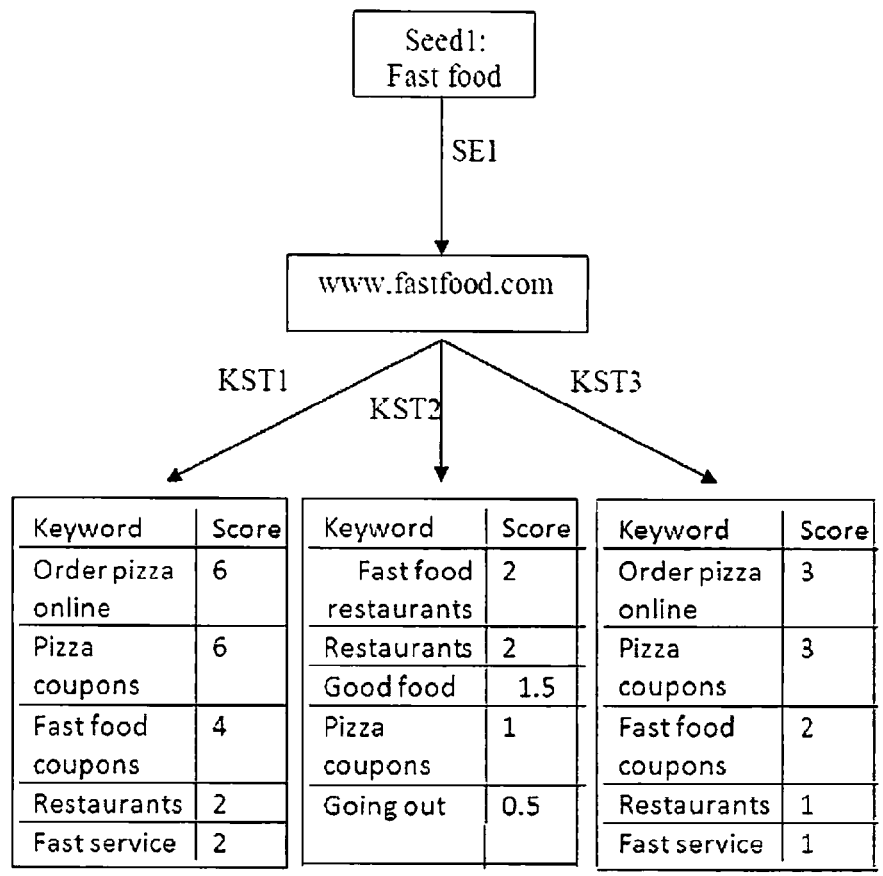

Certain embodiments of the system of the present invention are operative to perform one or more of the following:
(a) Iterating a multitude of seed keywords and merging results e.g. as shown and described herein with reference to FIG. 1. Steps 1, 15.
(b) Utilizing results produced by several search engines, to obtain top rated results e.g. as shown and described herein with reference to FIG. 1. Step 3.
(c) Using a number of keyword suggestion sources to augment the initial list with popular, related terms e.g. as shown and described herein with reference to FIG. 1. Step 5.
(d) Iterating a multitude of result pages and merging results for pages, e.g. as shown and described herein with reference to FIG. 1 Steps 4, 12.
(e) Repeatedly merging and combining the scores by means of an optimization method e.g. as shown and described herein with reference to FIG. 1. Steps 6, 7, 12, 13, 15, 16.

Most, if not all searches for content on the Internet are made through search engines. A prospective customer queries the search engine by entering into the search textbox one or more terms, which, in his view, reflect his demands. These terms or keyword expressions, are the sole input to a search engine, on which the order of display of search results is based. Out of many pages in view only the few top pages normally receive a customer's attention. These pages contain both organic links and sponsored links. Organic results are links to the most relevant websites with regard to the input keyword expressions. The proximity to the desirable top position portion of the search results is determined by a search engine's ranking method which ranks the relevance of each qualifying organic link (organic link containing the search word/s, typically) to each input query. Sponsored links are displayed only if a customer uses in his search a key phrase which is part of a list of keywords from the paid inclusion agreement between advertiser's website and the search engine. In both cases, if one wants to expose and promote content on the Internet, one should be equipped by a list of keywords, which are most effective to invest in, for promoting the context.

Example 1 below illustrates the process of producing such a list of keywords for an online pizza store.

The performance of a purchased keyword is measured in terms of two rates: the Click-Through-Rate (CTR) and the Conversion Rate (CR).

CTR is the proportion of entries into promoted content relative to the number of exposures of this content in response to the consumer searches. CR is the rate of customers who, after entering the website, complete the purchase (convert an entry to a sale).

It is important to find the keywords with proven high CTR because they attract customer traffic which may convert to sales.

Popular words which result in large CTR, do not necessarily yield a large conversion rate. CR may be viewed as probability of sale, conditional on click. Since each click costs money, it is desirable to achieve a high probability of an individual click's resulting in a sale. The cost-effectiveness of keywords is achieved via striking a balance between resources allocated to increasing CTR and those allocated to maximizing conversion rate.

A number of keyword suggestion tools are available. It is desirable to utilize the power of these services, which also provide the invaluable relative rating of the keywords. However, the volatility between results of different keyword suggestion tools is vast, both in terms of assortment of keywords and their rating. A marketer is often lost, encountering a sea of suggestions and failing to derive therefrom a single comprehensive set of keywords. Due to the difference between sources, it may be desirable to combine lists of keywords, in order to extract the best out of each source.

The present invention seeks to provide a method for deriving an improved list of key terms. Using the ability of search engines to provide good organic results and the ability of keyword suggestion tools to expand keywords to relevant lists, the assortment and quality of key terms may be enriched by exhaustive search and reconciliation of the search's varying results.

Good keywords may be of use in at least the following ways:
(a) in search engine optimization, by rectifying and optimizing online content so that it has a larger chance of being included in organic results; (b) in search engine advertising, by arranging for the search engine to provide a guaranteed inclusion of links to the promoted content; (c) in budget allocation (apportioning) of a campaign by utilizing the relevance score of key items.

The process of constructing collections of keywords by keyword listing expansion typically comprises establishing a regular routine which tracks performance of each individual key item and each keyword suggestion service, filtering out irrelevant badly performing keywords and keeping rare but relevant long tail keywords.

Definition of Terms

The following terms may be interpreted as follows or, alternatively or in addition, in accordance with any definition known in the art:

Keyword, item: String of one or more words, generally not more then ten words.

Source: A keyword suggestion tool e.g. a commercial or private software service or tool that produces a list of keywords for a given Internet address, or example 'Google Keyword Suggestion tool' located at the following location: https://adwords.google.com/select/KeywordToolExternal List of items: A table comprising "item" and "score" fields, the item and score information resulting from a search performed by a single source. See FIG. 2A for an example.

Merged lists of items: As in FIG. 2B, a table comprising fields "item" "score_1" "score_2" ... "score_m"
where "item" is unique in the list, which means that each keyword appears only once in the list and "score_i" is the score of the ith source for each item. If an item has no score from some source, a zero value for the score is typically assigned.

Seed items: Items used as input to the keyword expansion method shown and described herein.

Score: Measure or rating reflecting a keyword's popularity, competitiveness, relevancy, effectiveness etc. as perceived by a keyword suggestion source.

Organic result: linked to web page returned by a search engine in return to a search query performed by a user. Organic means the result is based on a search engine method that does not include payment for inclusion considerations.

FIGS. 1A-1B, taken together, form a simplified flowchart illustration of a Keyword extraction method constructed and operative in accordance with certain embodiments of the present invention.

1. Select one or more seed keywords to characterize a target website.
2. Repeat steps 3 to 14 for each seed keyword.
3. Repeat steps 4 to 12 for each search engine.
4. Obtain organic results from a search engine for a seed keyword, in order of their appearance.
5. Use one or more sources, keyword suggestion tools, to find lists of keywords and their scores.
6. Merge the lists of all sources. Example 1, Table 1.
7. Combine scores of words from all sources, using a score combining method. Example 1, Table 2.
8. Order the resulting list in descending order with respect to the combined score. Example 1, Table 2.
9. Using a cut-off criterion (see below), determine the "top of the list". Example 1 Step 4.
10. Compute the percentage p of new words contributed by the organic result to the top ranking list.
11. If p is greater than a pre-assigned threshold (see below), repeat steps 5-10 for the next organic result.
12. Otherwise, go to the next search engine.
13. Merge the resulting lists of all search engines.
14. Combine scores of words from all search engines, using a score combining method.
15. Merge the resulting lists of all seed words.
16. Combine scores of words from all seed words, using a score combining to arrive at a final list of keywords alongside their scores.

A Score combining method is now described.

Notational convention: lower type letters denote individual values, upper type letters denote arrays.

Let $$X^{(i)} = \begin{bmatrix} x_1^{(i)} \\ x_2^{(i)} \\ \ldots \\ x_n^{(i)} \end{bmatrix}$$

See FIG. 1 step 7 be the scores of results for n items (keywords or phrases or seeds) from the $i^{th}$ source (keyword expansion tool, or different methods, any software tool or service that produces a list of relevant keywords and their relevance score for a given Internet address, see 'Source' definition above.

If an item for a source is missing from the list the resulting score is set to zero. The matrix of result scores for all m sources is $$X = [X^{(1)}, X^{(2)}, \ldots, X^{(m)}].$$

Let $$W = [w^{(1)}, w^{(2)}, \ldots, w^{(m)}]$$

be the unknown vector of weights to be used for averaging the individual result scores of all sources. These weights are constrained to be non-negative:

$$w^{(1)} \geq 0, w^{(2)} \geq 0, \ldots, w^{(m)} \geq 0$$

and to sum up to 1:

$$w^{(1)} + w^{(2)} + \ldots + w^{(m)} = 1.$$

The combined result scores are $$X' = \sum_{i=1}^{m} w^{(i)} X^{(i)}.$$

Let $\overline{X}^{(i)}$ be a measure of central tendency of the $i^{th}$ list of scores. This measure may be the mean value, the median, the mid-range or any other type of sensible statistic that describes well the central target of a list. The vector of centrality measures for the m sources $$\overline{X} = [\overline{X}^{(1)}, \overline{X}^{(2)}, \ldots, \overline{X}^{(m)}]$$

does not have to be uniform, but may comprise different types of statistics for each of the sources.

Denote by R the matrix of result scores deviations from their individual central measures:

$$R = [R^{(1)}, R^{(2)}, \ldots, R^{(m)}]$$
$$= [X^{(1)} - \overline{X}^{(1)}, X^{(2)} - \overline{X}^{(2)}, \ldots, X^{(m)} - \overline{X}^{(m)}].$$

The weighted deviations are $$R' = \sum_{i=1}^{m} w^{(i)} R^{(i)}.$$

Various criteria for constructing an objective function for optimizing the weights w exist, such as sum of absolute values:

$$s(W) = \sum_{j=1}^{n} |R'_j|$$

of the vector R',
sum of squares:

$$s(W) = \sum_{j=1}^{n} (R'_j)^2$$

of the vector R',
and others. Here $R'_j$ is the jth row of the vector R'.

The objective function selected to minimize the spread about the common focus $\overline{X}$ of lists preferably comprises one, some or all of the following characteristics: first, it provides a fair chance for lists with scores of different order of magnitude to compete; second, it encourages lists that are more innovative with regard to the full reconciled list; and third, it penalizes results with many large outlying words, thus encouraging consistency relatively to a list's centrality measure.

The formal statement of the problem of finding the optimal weights W is:
Minimize s(W)
Subject to $w^{(1)} \geq 0, w^{(2)} \geq 0, \ldots, w^{(m)} \geq 0$ $$w^{(1)} + w^{(2)} + \ldots + w^{(m)} = 1.$$

To solve this constrained quadratic programming problem, one may use a commercially available optimization computer package, such as Solver, an MS Excell Ad-Inn.

Alternatively, in case of a quadratic objective function, a closed least squares solution may be used.

This method for solving the optimization problem, under the sum of squares objective function and linear equality constraint, is described next.

By substituting the equality constraint for one of the weights, say $w^{(m)}$, into the sum of squares objective function:

$$s(W) = \sum_{j=1}^{n} (R'_j)^2$$
$$= \sum_{j=1}^{n} [w^{(1)}r_j^{(1)} + \ldots + w^{(m-1)}r_j^{(m-1)} +$$
$$(1 - w^{(1)} - \ldots - w^{(m-1)})r_j^{(m)}]^2$$
$$= \sum_{j=1}^{n} [r_j^{(m)} - w^{(1)}(r_j^{(m)} - r_j^{(1)}) - \ldots -$$
$$w^{(m-1)}(r_j^{(m)} - r_j^{(m-1)})]^2,$$

and ignoring (for the moment) the non-negativity constraints, the problem is reduced to a least square regression of $r_j^{(m)}$ on $(r_j^{(m)}-r_j^{(1)}), \ldots, (r_j^{(m)}-r_j^{(m-1)})$, The solution to the above is $$W = (Q^T Q)^{-1} Q^T b,$$

where $$Q = \begin{bmatrix} r_1^{(m)} - r_1^{(1)} & r_1^{(m)} - r_1^{(2)} & \cdots & r_1^{(m)} - r_1^{(m-1)} \\ r_2^{(m)} - r_2^{(1)} & r_2^{(m)} - r_2^{(2)} & \cdots & r_2^{(m)} - r_2^{(m-1)} \\ \cdots & \cdots & \cdots & \cdots \\ r_n^{(m)} - r_n^{(1)} & r_n^{(m)} - r_n^{(2)} & \cdots & r_n^{(m)} - r_n^{(m-1)} \end{bmatrix},$$

$$b = \begin{bmatrix} r_1^{(m)} \\ \cdots \\ r_n^{(m)} \end{bmatrix}.$$

The superscript T denotes matrix transpose.

To deal with the non-negativity constraint, one proceeds as follows. If there is at least one negative w, minimal negative w is be found, $w_k = \min\{w_1, \ldots, w_m\}$.

Next the weights are redefined by subtracting from each w this minimal $w_k$ and rescaling them to sum up to one:

$$w'_i = \frac{w_i - w_k}{1 - m w_k}.$$

Note that this action leaves $w'_k$ equal to zero, while rest of the weights are positive.

Alternatively, negative weights may be allowed, keeping however in mind that the meaning of this is reversing the order of the affected scores.

In a particularly useful situation of two sources this method simplifies to computing:

$$v = \frac{\sum_{j=1}^{n} (r_j^{(2)} - r_j^{(1)}) r_{ji}^{(2)}}{\sum_{j=1}^{n} (r_j^{(2)} - r_j^{(1)})^2}$$

$$w_1 = \begin{cases} v, & 0 < v < 1 \\ 0, & v \leq 0 \end{cases}$$

$$w_2 = 1 - w_1$$

Cut-Off Rules

A cut-off rule for deciding on the most useful "top" part of a keyword list may be, amongst others, the following:

For a list of items, sorted in ascending order by their scores, $$\begin{bmatrix} x_{(1)} \\ x_{(2)} \\ \cdots \\ x_{(n)} \end{bmatrix}$$

See FIG. 1 step 9 we define their differenced series as $$\begin{bmatrix} \Delta x_{(2)} \\ \Delta x_{(3)} \\ \cdots \\ \Delta x_{(n)} \end{bmatrix} = \begin{bmatrix} x_{(2)} - x_{(1)} \\ x_{(3)} - x_{(2)} \\ \cdots \\ x_{(n)} - x_{(n-1)} \end{bmatrix}.$$

The first point of largest acceleration, $$\min\{k : \Delta x_{(k)} = \max_j(\Delta x_{(j)})\}$$

is now used as the cut-off point. It stands to reason to assume that at each iteration of the method this point has a sufficient power of separation between the "top" and "bottom" of the list. See Example 1 Step 4.

Stopping Rules

Since search engines present a great multitude of organic results, one has to decide when to cease iterating along them. The following stopping or convergence rule. amongst others, may be used, See Example 1, Step 5. At each iteration, one calculates the percentage p of new words contributed by the organic result to the top ranking list. If p is less than a pre-assigned percentage threshold, say 1% to 5%, the search result at this stage may be assumed to be exhausted of new words, and its use may be terminated.

EXAMPLE 1

A step by step illustrative example of the method of FIGS. 1A-1B is now described.

Step 1: Sam owns a pizza place which he wants to advertise online. He thinks of two seed keywords: Seed1=fast food and Seed2=pizza.

Step 2: A computer in which a software program representing the method of FIGS. 1A-1B is stored, repeats step 3 to 14 twice, once for "fast food" and once for "pizza".

Step 3: The computer repeats steps 4 to 12 for each of two search engines: SE1 and SE2, of which the first is, by way of example, Google, and the second Yahoo.

Step 4: Use the current search engine to search the current seed keyword.

Step 5: The programmed computer then takes the top result of the search performed in step 4, and extracts keywords therefrom using three different designated keyword Suggestion tools: KST1, KST2 and KST3. By way of example, these may be Google's Keyword Suggestion Tool, Overture suggestion tool and Wordtracker keyword tool.

The output of step 5, for keyword "fast food" and the Google search engine, may for example comprise the output shown in FIG. 2A.

Step 6: The three lists shown in FIG. 2A are merged into a single list as shown in FIG. 2B. FIG. 2B is a representation, typically stored in memory, of a merged list of words for the first result (a link termed "fastfood.com"), generated by SE1 (Google search engine) for Seed1 (fast food). The score of a keyword from a particular source is taken to be 0 if that keyword was not even identified by that source. For example, "good food" was identified only by source 2, so its scores from sources KST1 and KST3 are zero in the table of FIG. 2B.

Step 7: For each keyword on the list shown in FIG. 2B, compute a merged or combined score, as shown in FIG. 2C by combining that keyword's three scores from the 3 sources respectively.

An example of a method for combining the three scores characterizing each keyword, into a single merged or combined score, shown in the right-hand column of the table of FIG. 2C, is as follows:

$$X^{(1)} = \begin{bmatrix} 6 \\ 6 \\ 4 \\ 2 \\ 3 \\ 0 \\ 0 \end{bmatrix} X^{(2)} = \begin{bmatrix} 2 \\ 1 \\ 0 \\ 2 \\ 0 \\ 1.5 \\ 0.5 \end{bmatrix} X^{(30)} = \begin{bmatrix} 3 \\ 3 \\ 2 \\ 1 \\ 1 \\ 0 \\ 1 \end{bmatrix}$$

Searching for:

$$W = [w^{(1)}, w^{(2)}, w^{(3)}]$$

where:

$$w^{(1)} \geq 0, w^{(2)} \geq 0, w^{(3)} \geq 0$$

and:

$$w^{(1)} + w^{(2)} + w^{(3)} = 1$$

The mean values as $\overline{X}$ are $$\overline{X} = [3, 1, 1.57]$$

$$R = [R^{(1)}, R^{(2)}, \ldots, R^{(m)}]$$
$$= [X^{(1)} - \overline{X}^{(1)}, X^{(2)} - \overline{X}^{(2)}, X^{(3)} - \overline{X}^{(3)}] =$$

$$R^{(1)} = \begin{bmatrix} +3 \\ +3 \\ +1 \\ -1 \\ 0 \\ -3 \\ -3 \end{bmatrix} R^{920} = \begin{bmatrix} +1 \\ 0 \\ -1 \\ +1 \\ -1 \\ 0.5 \\ -0.5 \end{bmatrix} R^{(3)} = \begin{bmatrix} 1.43 \\ 1.43 \\ 0.43 \\ -0.57 \\ -0.57 \\ -1.57 \\ -0.57 \end{bmatrix}$$

The weighted deviations are:

$$R' = \sum_{i=1}^{m} w^{(i)} R^{(i)}.$$

The programmed computer may use sum of squares as the objective function:

$$s(W) = \sum_{j=1}^{n} (R'_j)^2.$$

In this case, the optimization problem is
Minimize s(W)
Subject to $w^{(1)} \geq 0, w^{(2)} \geq 0, \ldots, w^{(m)} \geq 0$
$$w^{(1)} + w^{(2)} + \ldots + w^{(m)} = 1.$$

Solving this constrained programming problem with a conventional optimization computer package such as Microsoft Excel Solver yields:

$$w^{(1)} = 0.344, w^{(2)} = 0.402, w^{(3)} = 0.254$$

Merged list of words for with combined scores produced by three Keyword suggestion tools for first result in SE1 for Seed1

Step 9:

Applying a cut-off rule for deciding on the most useful "top" part of the keyword list of FIG. 2C:

$$\begin{bmatrix} 4 \\ 3.2 \\ 1.9 \\ 1.4 \\ 1.3 \\ 0.6 \\ 0.5 \end{bmatrix} \begin{bmatrix} \Delta x_{(2)} \\ \Delta x_{(3)} \\ \Delta x_{(4)} \\ \Delta x_{(5)} \\ \Delta x_{(6)} \\ \Delta x_{(n)} \end{bmatrix} = \begin{bmatrix} -0.8 \\ -1.3 \\ -0.5 \\ -0.1 \\ -0.7 \\ -0.1 \end{bmatrix}$$

$$\min\{k : \Delta x_{(k)} = \max_j(\Delta x_{(j)})\} = 4$$

reached at $\max_j\{\Delta x_{(j)}\} = -0.1$.

In the present example, the "top of the list" includes the 4 first keywords from the list in FIG. 2C, namely "order pizza online", "pizza coupons", "fast food coupons" and "restaurants".

Step 10: The computer programmed in accordance with the method of FIGS. 1A-1B now tests the stopping rule in order to decide whether to proceed to the next result within the same search engine, or whether to proceed to the next search engine.

Four new words were added in the last iteration.
Total number keywords is 4

(4/4)/*100=1>0.3

Step 11: A pre-assigned threshold of 30% may be employed. Since p as computed in step 10 is greater than the pre-assigned threshold, another iteration of steps 5 to 10 is now executed, this time using the next organic result (Result 2) from SE1. For example, when the Google search engine (SE1) searched for "fast food" (Seed1), the second result, following the first result which was fastfood.com, may have been universalfastfoods.co.il. So, steps 5 to 10 are now executed for universalfastfoods.co.il rather than for fastfood.com as in the first iteration.

Step 12: Eventually, the program finishes its work on the first engine, SE1 (Google in the present example) and then does the same work, mutatis mutandis, for the second engine SE2 (Yahoo in the present example). For example, after performing steps 5 to 10 for universalfastfoods.co.il, the system may compute:

$$\min\{k : \Delta x_{(k)} = \max_j(\Delta x_{(j)})\} = 5$$

$$\text{at } \max_j\{\Delta x_{(j)}\} = -0.2,$$

The 5 first keywords are taken from the list, as can be observed in FIG. 2D.

New words added by this iteration are 1 ("restaurant guide")

Current total keywords is 5

Since (1/5)/*100<30, the loop for SE1 is terminated and the same loop is performed for SE2.

Assuming that step 11, in the loop corresponding to search engine SE2, causes two iterations to be performed for SE2 (Yahoo), on first and second results SE2Result1 and SE2Result2 respectively. The results which are obtained, in the current example, from the loop corresponding to search engine SE2, for SE2Result1 and SE2Result2 respectively, are shown in FIGS. 2E and 2F respectively.

Step 13: All tables for Seed1 (fast food) are merged, over all search engines and all results, as shown in FIG. 2G. In the illustrated example, the following tables are merged for Seed1: table of FIG. 2C for SE1 and SE1Result1, table of FIG. 2D for SE1 and SE1Result2, table of FIG. 2E for SE2 and SE2Result1 and table of FIG. 2F for SE2 and SE2Result2. It is appreciated that the fact that the loops for SE1 and for SE2 happened to have two iterations each, is coincidental; in another example, the number of per-result iterations in the various per-search engine loops performed for a single seed need not be the same.

Similarly, as shown in FIG. 3E, all tables for Seed2 (pizza) are merged, over all search engines and all results. In the illustrated example, the following tables are merged for Seed2: table of FIG. 3A for SE1 and SE1Result1, table of FIG. 3B for SE1 and SE1Result2, table of FIG. 3C for SE2 and SE2Result1 and table of FIG. 3D for SE2 and SE2Result2.

Step 15: combined scores for both seeds presented in FIG. 4A

Step 16. List of words sorted by relevance score presented in FIG. 4B

The scope of the present invention includes inter alia any or all of the following: a computerized system or method for enhancing keyword expansion, and comprising an apparatus for iterating a plurality of seed keywords; a computerized system or method for enhancing keyword expansion and using at least one seed comprising apparatus for merging results within an individual seed; a computerized system or method for enhancing keyword expansion and using a plurality of seeds comprising apparatus for merging results between seeds; and a computerized system or method for enhancing keyword expansion comprising apparatus for repeatedly merging and combining scores using an optimization method.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order.

The invention claimed is:

1. A computerized method for enhancing keyword expansion for promoting digital content, comprising:
    accessing a plurality of search engines using at least one input seed keyword, each of the plurality of search engines returns organic results respective of the at least one input seed keyword;
    for each organic result returned by each of the plurality of search engines, retrieving, using a plurality of keyword suggestion sources, a list of key terms and their scores;
    merging the list of key terms and their scores from each of the plurality of keyword suggestion sources into a merged list respective of each of the at least one input seed keyword and scores thereof;
    combining the scores for each of the key terms in the merged list into a single combined score;
    associating the single combined score with a respective input seed keyword; and
    reporting the single combined score for each of the key terms for the at least one input seed keyword and the merged list resulting from access of the plurality of search engines and keyword suggestion sources, wherein the merged list contains the keyword expansion.

2. The computerized method according to claim 1, further comprises:
    selecting said key terms based on a popularity criterion.

3. The computerized method according to claim 1, further comprises:
    selecting said key terms based on a criterion of relatedness.

4. The computerized method according to claim 1, wherein enhancing keyword expansion further comprises: iterating a plurality of result pages.

5. The computerized method according to claim 4, further comprises: reusing results as secondary seeds for further refinement.

6. The computerized method according to claim 1, wherein enhancing keyword expansion further comprises: iterating a plurality of seed keywords.

7. The computerized method according to claim 6, further comprises: reusing results as secondary seeds for further refinement.

8. The computerized method according to claim 1, further comprises:
    merging results within an individual seed keyword using the at least one input seed keyword.

9. The computerized method according to claim 8, further comprises reusing results as secondary seeds for further refinement.

10. The computerized method according to claim 1, further comprises: merging results between a plurality of seed keywords.

11. The computerized method according to claim 10, further comprises: reusing results as secondary seeds for further refinement.

12. The computerized method according to claim 1, further comprises: combining scores is performed using an optimization method.

13. The computerized method according to claim 12, further comprises: reusing results as secondary seeds for further refinement.

14. The computerized method according to claim 12, wherein combing the scores further comprising:
  generating a combined score of a key term by summing the multiplication of the scores of the respective key terms retrieved from the keyword suggestion sources with weights, wherein the weights are constrained to be non-negative and the constraint is solved using the optimization method.

15. The computerized method according to claim 1, further comprises: reusing results as secondary seeds for further refinement.

16. The computerized method according to claim 1, further comprises: reuse reusing results as secondary seeds for further refinement.

17. The computerized method according to claim 1, further comprising: selecting using a cut-of-rule a set of organic results out of the retrieved organic results to be processed.

* * * * *